United States Patent
Ledger

Patent Number: 5,365,340
Date of Patent: Nov. 15, 1994

[54] APPARATUS AND METHOD FOR MEASURING THE THICKNESS OF THIN FILMS

[75] Inventor: Anthony M. Ledger, New Fairfield, Conn.

[73] Assignee: Hughes Aircraft Company, Los Angeles, Calif.

[21] Appl. No.: 987,926

[22] Filed: Dec. 10, 1992

[51] Int. Cl.$^5$ .............................................. G01B 11/02
[52] U.S. Cl. ..................... 356/357; 356/381; 356/382; 356/369
[58] Field of Search ............... 356/357, 355, 381, 382, 356/369

[56] References Cited

U.S. PATENT DOCUMENTS

| 4,585,348 | 4/1986 | Chastang et al. | 356/369 |
| 4,707,611 | 11/1987 | Southwell . | |
| 4,999,508 | 3/1991 | Hyakumura . | |
| 5,042,949 | 8/1991 | Greenberg et al. | 356/382 |

FOREIGN PATENT DOCUMENTS

| 0358936 | 3/1990 | European Pat. Off. . |
| 0511777 | 11/1992 | European Pat. Off. . |

Primary Examiner—Samuel A. Turner
Assistant Examiner—LaCharles Keesee
Attorney, Agent, or Firm—M. E. Lachman; M. W. Sales; W. K. Denson-Low

[57] ABSTRACT

A measurement instrument which detects the thickness of the outer layer of a wafer 24, includes a filtered white light source forming an aperture image. The white light source includes a halogen lamp 10, a condensing lens 12, a circular aperture 14, a collimator lens 16, a narrow band filter wheel 18, and a second collimator lens 20. A monochromatic beam generated by this filtered white light source illuminates the entire surface of the wafer 24 with collimated light that has passed through a third collimator lens 22. The light reflected off the wafer 24 returns through the third collimator lens 22 and forms an aperture image upon an optical device which redirects this image to a charge coupled device (CCD) camera 30. The image is converted to a map of measured reflectance data by a digitizing circuit 34 and a computer 36. This map of measured reflectance data is then self-normalized and compared to reference reflectance data to generate a map of the outer layer thickness profile of the wafer 24.

26 Claims, 3 Drawing Sheets

APPARATUS AND METHOD FOR MEASURING THE THICKNESS OF THIN FILMS

BACKGROUND OF THE INVENTION

1. Cross Reference to Related Application

This application discloses subject matter that is disclosed and claimed in copending application Ser. No. 07/804,872 filed on Dec. 6, 1991, entitled "Apparatus and Method for Measuring the Thickness of Thin Films" and assigned to the assignee hereof and which is hereby expressly incorporated by reference.

Also hereby expressly incorporated by reference are related copending applications, also assigned to assignee hereof, having U.S. Ser. Nos. 07/906,079 (filed Jun. 29, 1992) and 07/891,344 (filed May 29, 1992) respectively entitled "Apparatus and Method for Performing Thin Film Layer Thickness Metrology on a Thin Film Layer Having Shape Deformations and Local Slope Variations" and "Apparatus and Method for Performing Thin Film Layer Thickness Metrology By Deforming A Thin Film Layer Into A Reflective Condenser."

2. Field of the Invention

The present invention relates to an apparatus and method for measuring a thin film or layer thickness and, without limitation, to an electro-optical system which measures the thickness of an outer silicon layer of a silicon/silicon dioxide/silicon (Si/SiO$_2$/Si) structured semiconductor wafer.

3. Description of the Prior Art

The above cited copending application discloses and claims an invention that is especially practical for measuring the thickness of a silicon-on-insulator (SOI) semiconductor wafer which typically includes a Si/SiO$_2$/Si sandwich structure fabricated by growing a silicon dioxide film on one surface of each of two silicon wafers and bonding the two silicon dioxide film surfaces together at high temperature. It should be understood, however, that the earlier invention and the present invention can be used for measuring any number of layers providing only one layer thickness is unknown and the optical properties of all layers are accurately known. It should also be understood that other materials such as, for example, silicon nitride, may be used for the insulator material and that other materials may be used for the wafer material. In such an application, one of the two outer silicon surfaces of the sandwich structure is mechanically ground and polished to an average thickness of several microns. This mechanical process unfortunately results in large spatial variations in the thickness of this outer silicon layer over the surface of the wafer. To reduce these spatial variations, a thickness error map that indicates thickness non-uniformities of this outer silicon layer over the entire wafer surface, is required, for example, to initialize a further micropolishing process.

A sequence of measuring the spatial variations in the thickness of the outer silicon layer followed by thinning and smoothing this surface by micropolishing needed to be performed several times before the entire outer silicon layer achieves the desired thickness. In order to reduce costs and increase production, a measurement of at least 400 points on a wafer surface in 60 seconds is desirable.

Before the above cited invention was made, measuring instruments typically provided film thickness measurements at only a single point on a surface. These instruments use a focused lens or a fiber bundle to locally illuminate the film surface with a beam of monochromatic light, and a grating or prism spectrograph to measure the surface spectral reflectance at each point. In all cases, this surface spectral reflectance data must be numerically corrected due to variations in the angle of incidence caused by the illuminating beam f-number.

These commercial instruments may be extended to cover an entire wafer surface by moving either the measuring instrument or the wafer in a controlled manner. However, the time required for these instruments to determine the thin film layer thickness at a single point is on the order of several minutes and characterizing an entire film surface of at least 400 measurement points far exceeds the time desired for efficient wafer production.

The above cited application disclosed an electrooptical imaging system for efficiently determining a thin film layer thickness of, for example, a wafer over a full aperture. Non-uniformities in this layer thickness are obtained by measuring the reflectance characteristics for a full aperture of a wafer surface and comparing this measured reflectance data to reference reflectance data by using numerical iteration or by using a calibration wafer having known layer thicknesses.

To efficiently measure the reflectance characteristics of a wafer layer, according to the above cited application, a filtered white light source is used to produce a sequence of collimated monochromatic light beams at several different wavelengths. These collimated monochromatic beams are individually projected onto the entire surface of the wafer, and coherent interactions occur between this light as it is reflected from the physical boundaries in the wafer structure. As a result of these interactions an interference fringe pattern is formed on the surface of the wafer for each projected beam and, consequently, for each wavelength. A reflected image of each fringe pattern is projected onto a detector array of, for example, a charge coupled device (CCD) camera, where the full aperture of this image is then captured. The fringe pattern image is captured by digitizing pixels in the CCD camera detector array corresponding to the image present. A reflectance map of the entire wafer surface is generated from this captured fringe pattern image. Several reflectance maps are generated from each measured wafer to eliminate thickness ambiguities which may result from outer layers having phase thicknesses greater than $2\pi$.

The reference reflectance data for a wafer, as mentioned above, may be obtained, according to the above cited application, by a theoretical calculation or through the use of a calibration wafer. The theoretical method consists of numerically computing reference reflectance characteristics based on assumed values for the intrinsic optical properties of the wafer materials. Alternatively, a calibration wafer, having a known thickness profile, may be constructed from the same batch of materials used to construct the wafer to be measured. By subjecting this calibration wafer to the measuring method of the present invention, reference reflectance data is obtained for the known wafer.

According to the teachings of the above cited application, the comparison between the measured reflectance data and the reference reflectance data can then be performed by a computer. Upon performing this comparison, the computer can provide a mapping of layer thickness or a mapping of layer thickness nonuniformities over a full aperture of the wafer.

The silicon-on-insulator (SOI) wafers that are measured, consist of two silicon wafers sandwiching a thin layer of silicon dioxide and typically suffer mechanical distortion caused by the manufacturing and polishing process. This results in surface deformations of 50 to 100 microns and local slope changes up to ¼ a degree. According to the above cited application, measurement of the thickness of the outer film of silicon requires forming images of the wafer on a CCD camera at various monochromatic wavelengths in the visible region. The images are digitized (512×512 pixels) and this data is used to derive the spatial variations of the wafer reflectance caused by differing thicknesses of the silicon film.

According further to the above cited application, a library of reflectance values for different values of the outer film thickness is precalculated at all the different wavelengths and is used to find a match between the measured sampled spectral reflectance and the precalculated sampled spectrum by using a least squares fitting technique. This calculation requires the actual reflectances of the SOI wafer to be derived from the digitized data before the least squares fitting technique can be carried out. However, the intensities in the digitized images are not only proportional to the wafer reflectances but also to the spectral properties of the light source, the camera and the coatings in the optical system. Thus, an absolute measure of the SOI wafer reflectance can be obtained by recording an additional set of images of a bare silicon wafer, and since the reflectance of bare silicon is accurately known, then the wafer reflectance can be scaled from the data in the two sets of images.

The use of two sets of measurements at different times requires that the two wafers being accurately aligned in position and angle. The light source must also be stable in amplitude over the measurement time of about one minute.

SUMMARY OF THE INVENTION

An object of the present invention is to improve the above described thickness determination by reducing the number of measured images.

According to the present invention, a significant improvement can be made in a thickness determination of the general type described above, by realizing that each pixel can be treated as an independent reflectometer and that each reflection at a given wavelength for that pixel can be self-normalized with respect to other reflections at different wavelengths for the same pixel.

In further accord with the present invention, uniformity variations in reflectance caused by spectral response can be premeasured and eliminated in advance of calculating the merit function.

As a result, the use of wafer reflectance in the merit function can be replaced by matching a self normalized reflectance pattern as opposed to an absolute reflectance pattern. This new approach allows the number of measured images to be reduced by a factor of two by eliminating the need for measurements on a bare silicon wafer. In this scheme, the 2N measurements are replaced by N images and N spectral shape calibration constants. Measured data from one pixel consists of N digitized values $V_1 \ldots V_N$ at the wavelengths $X_1 \ldots X_N$ and the data at a pixel is normalized by dividing the data $V_k$ at a given wavelength by the sum of all the digitized values at all the wavelengths. These ratios can also be further modified to create a flat spectral response by dividing each one by the gain of the system. Since the library also has a flat spectral response, the ratios can also be computed theoretically and used in the least squares pattern matching technique.

These and other objects, features and advantages of the present invention will become more apparent in light of the following detailed description of a best mode embodiment thereof, as illustrated in the accompanying drawing.

DETAILED DESCRIPTION OF THE PRESENT INVENTION

Figure 1:
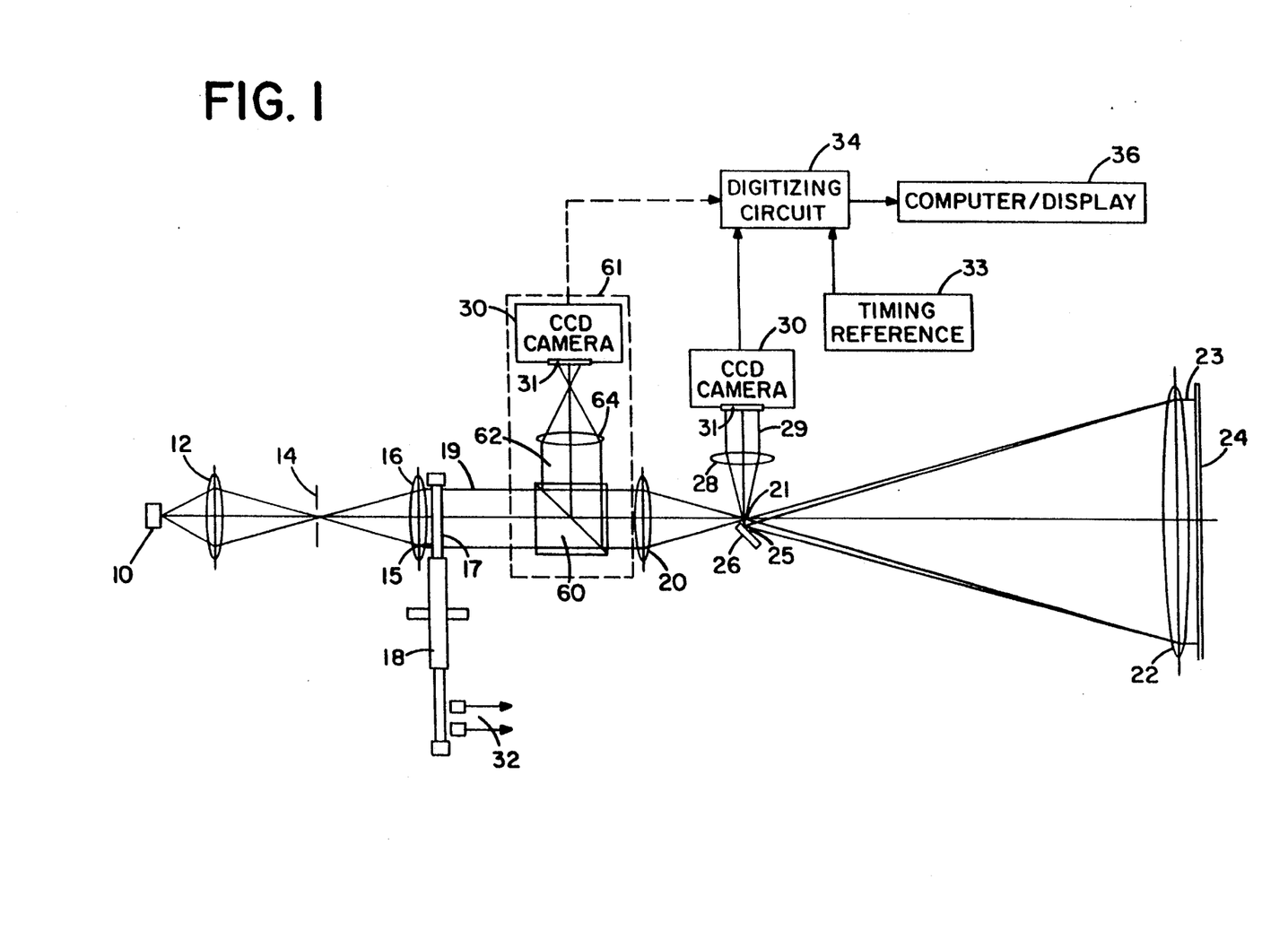
FIG. 1 is a schematic representation of a wafer layer thickness measuring instrument that can be used according to the present invention.

An electro-optical system for measuring a layer thickness of a wafer 24, according to the present invention, is shown in FIG. 1. For the purposes of this description, the measurement of an outer silicon layer of a SOI semiconductor wafer 24 is described.

The apparatus of FIG. 1 provides a white light source comprised of a circular aperture 14 illuminated by a halogen lamp 10 and a condensing lens 12. Light passing through aperture 14 impinges on a collimator lens 16 to form a beam 15 of collimated light. The size of the aperture 14 determines the field angles in the collimated light sections of the optical system and the orientation is chosen to allow an aperture image to be projected onto the SOI wafer 24. It should be noted that the condensing lens 12 may be replaced by a fiber optic light guide.

The white light source is spectrally filtered by a series of narrow band filters 17, nominally of 30Å to 50Å half bandwidth, placed in the collimated beam 15. The series of filters 17 are placed around the periphery of a rotating filter wheel assembly 18, whereby a corresponding series of collimated monochromatic light beams 19 are produced. The wavelengths of these collimated monochromatic light beams 19 range, for example, from 550 nm to 950 nm. Locating the filter wheel assembly 18 in a collimated light section 15 minimizes the spectral broadening of the filtered beam 19 caused by the field angle defined by the size of the aperture 14. A pair of electronic signals 32 are generated by the filter wheel assembly 18 to serve as a timing reference 33 for a digitizing circuit 34. One of these signals indicates the beginning of a filter wheel revolution, whereas the other signal indicates the beginning of each filter period.

A second collimator lens 20 forms a monochromatic image of the aperture 14 about a point 21 in a focal plane of a third collimator lens 22. This third collimator lens 22 produces a collimated beam 23 which illuminates the full aperture of, for example, a 100 millimeter diameter SOI wafer 24. Also, an extension of this wafer illumination technique to wafers of 150 millimeters or 200 millimeters in diameter requires that the size of the third collimator lens 22 match the wafer size. It should be noted that a monochromator can replace the halogen lamp 10, the condensing lens 12, the first two collimator lenses 16, 20, and the narrow band filter wheel 18, provided that the slewing rate of the monochromator between different wavelengths is sufficiently high, up to twenty different wavelengths in less than one second.

Figure 2:
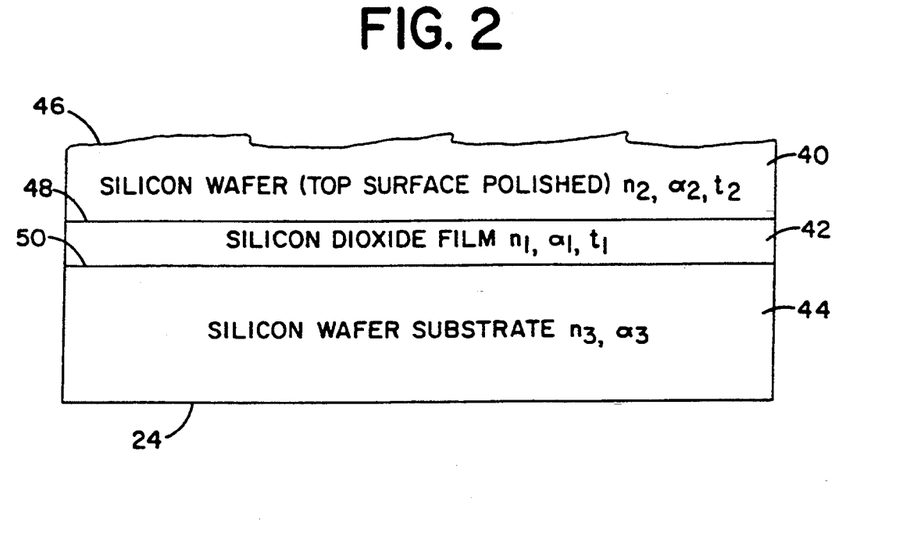
FIG. 2 is a cross-sectional view of a SOI semiconductor wafer.

Referring to FIG. 2, an exaggerated cross-sectional view of a SOI semiconductor wafer 24 is shown. This wafer 24 is constructed in a sandwich structure consisting of a mechanically polished outer silicon layer 40, an internal silicon dioxide (SiO$_2$) film 42, and a silicon wafer substrate 44. This sandwich structure creates three interfaces 46, 48, 50 from which light, incident upon the outer silicon layer 40, may be reflected. The reflectance characteristics of these interfaces 46, 48, 50 are based upon the intrinsic optical and physical properties of the semiconductor materials in each layer 40, 42, 44 of the SOI wafer These properties consist of the absorption coefficient, $\alpha$, the index of refraction, n, and the thickness, t, of the material layers 40, 42, 44. For an SOI wafer, it is assumed that the absorption coefficient, $\alpha$, of the SiO$_2$ layer 42 is zero. However, in general it is permissible that the absorption coefficient be non-zero, provided that it is known.

When the surface of the SOI wafer 46 is illuminated with collimated monochromatic light from beam 23, a series of coherent interactions occur as this light is reflected between the three material interfaces 46, 48, 50 of the SOI structure 24. These interactions produce a wavelength dependent interference pattern that is visible upon the surface of the wafer. The reflectance at any point on the wafer is determined by the multiple reflections between the three surfaces and by the magnitudes of their physical properties, $n_1,\alpha_1, t_1$, and $n_2,\alpha_2,t_2$ as well as the properties of the substrate $n_3,\alpha_3$. In the unique case of an SOI wafer structure, the substrate indices are identical to those of the outer film indices ($n_3=n_2, \alpha_3=\alpha_2$) since both are fabricated from single crystal silicon.

The wafer reflectance at any wavelength can be calculated explicitly as a function of the outer film thickness if all the other parameters are known; however, the reverse problem of computing the thickness from a single measured reflectance is ambiguous. This ambiguity is created by the fact that as the outer film thickness is increased, the measured reflectance cycles between maximum and minimum values as the phase thickness ($n_2 t_2$) increases by multiples of $\pi/4$. This multi-valued problem clearly makes the computation of the value of $t_2$ from a single reflectance measurement impossible. The use of multiple wavelength measurements can in principle overcome the multiple value problem but the wavelength dependent behavior of the material properties must be very accurately known; otherwise, large errors occur in the thickness computations.

An alternate approach is a statistical one where measured reflectance data at several wavelengths is compared on a least squares best fit basis with a library of computed spectral data at the same wavelengths. In the case of an SOI wafer, the library of spectra is computed for all values of the outer film thickness and the selection is made by choosing that outer film thickness which minimizes the least squares fit.

Referring back to FIG. 1, a collimated light image of the interference fringe pattern is reflected off the surface of the SOI wafer 24 and returned through the third collimator lens 22. This third collimator lens 22 projects a condensed image of the reflected fringe pattern upon an off-axis mirror 26. This mirror 26 is positioned at a point 25 in the focal plane of the third collimator lens 22, alongside the position of the aperture image at focal point 21. The separation of these two focal points 21, 25 may be controlled with a slight lateral shift in the optical axis of the third collimator lens 22 with respect to the optical axis of the condensing lens 12 and the first two collimator lenses 16, 20. Equivalently, the wafer 24 may be tilted through a small angle, less than one degree, to achieve this same effect. This image separation scheme avoids the use of a beamsplitter which contains metallic coatings with attendant optical losses.

The off-axis mirror 26 is used to redirect the reflected fringe pattern image from the wafer 24 to a final collimator lens 28. This final collimator lens 28 projects a collimated beam 29 containing an image of the fringe pattern onto a CCD camera detector array 31. It should be noted that the filter wheel assembly 18 may also be placed in this collimated beam 29 provided that the field angle, which is approximately fifteen times larger than the field angle in the collimated beam 23 illuminating the wafer 24, can be tolerated by the narrow band filters.

An alternate method of providing the reflected fringe pattern image to the CCD camera detector array 31 is shown in a dashed line block 61 in FIG. 1. An on-axis beamsplitter 60 is placed in the collimated light beam section 19 where the filter wheel assembly 18 is positioned. The beamsplitter 60 receives a collimated fringe pattern image from the second collimator lens 20 and reflects a portion 62 of this collimated beam to a final collimator lens 64. This final collimator lens 64 converges the fringe pattern image onto the CCD camera detector array 31. Although this alternate method results in optical losses which are inherent in beamsplitters, it does not require an image separation scheme which can introduce field angle errors in the collimated light beam 23 reflected from an off-axis SOI wafer 24. As with the previous method, the filter wheel assembly 18 may be placed in the collimated beam 62 reflected by the beamsplitter 60, provided that the field angle can be tolerated by the narrow band filters 17.

The determination of the method used to provide the reflected fringe pattern image to the CCD camera 30 is critically dependent upon the optical performance of the third collimator lens 22. When using the off-axis mirror method, the optical design of the third collimator lens 22 must possess an optimal off-axis performance quality and provide a minimal radial color distortion effect. Optimal off-axis performance minimizes the distortion effects associated with field angles that are created when the collimated light beam 23 is reflected from an off-axis non-uniform surface of a SOI wafer 24. Also, the need for a consistent fringe pattern image size at the CCD camera detector array 31 requires radial color distortion correction over the wavelength region of the incident monochromatic light. When the on-axis beamsplitter method is used, however, only the radial color distortion correction requirement applies since the: field angles produced in the collimated light beam 23 reflected from an on-axis SOI wafer surface 46 are negligible. Therefore, if the returned fringe pattern image is distorted due to sub-optimal off-axis performance by the third collimator lens 22, then the off-axis mirror method is unsuitable and an on-axis beamsplitter 60 must be used.

Figure 3:
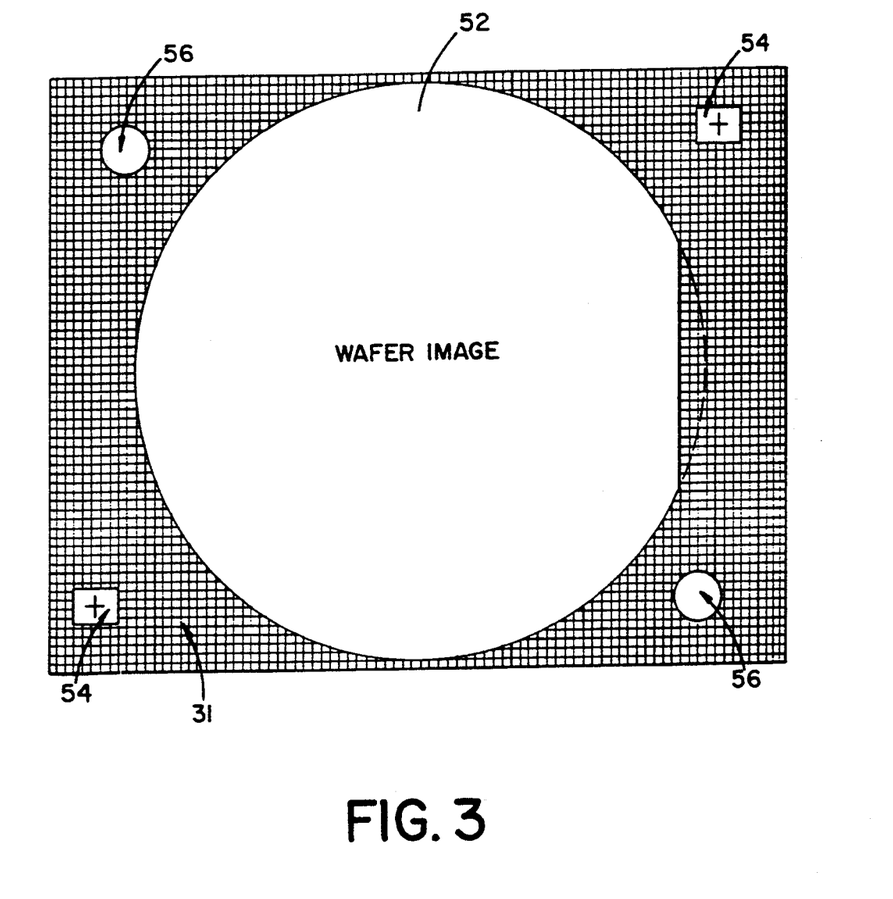
FIG. 3 is a plan view of a CCD camera detector array showing a wafer image outline and several reference surface image outlines.

Referring to FIG. 3, the CCD camera detector array 31 is shown with an image of a scaled SOI wafer outline 52, a pair of reference alignment images 54, and a pair of reference reflecting images 56, projected upon its surface. These reference images are formed by placing reference alignment marks and reference reflecting surfaces along the same plane as the surface of the SOI wafer 24. When illuminated with a collimated light beam 23 from the third collimator lens 22, these references provide reflections from their surfaces. Similar to the SOI wafer fringe pattern, images of these reflected references are returned through the third collimator lens 22 and are eventually projected upon the CCD camera detector array 31. The reference alignment marks provide aid in wafer alignment, whereas the reference reflecting surfaces are used to self-normalize the CCD signals, according to the invention, so that actual wafer reflectances can be calculated.

Referring back to FIG. 1, the collimated beam formed by the final collimator lens 28 contains an image of the reflected fringe pattern. This image is projected upon the CCD camera detector array 31 and captured by the CCD camera 30. A reflectance map is generated by digitizing the CCD pixel signals corresponding to the projected fringe pattern image with a digitizing circuit 34. This raw reflectance data may be normalized to eliminate variations in pixel sensitivity and may be reduced in size by averaging signals over blocks of pixels to match the spatial limitations of the subsequent chemical micropolishing process. According to the present invention, in determining the thickness, $t_2$, of the outer silicon layer of the SOI wafer 24, a numerical computation method is used. Both of these methods require the use of a computer According to the above cited copending application, the numerical method of determining outer silicon layer thickness, $t_2$, consists of assuming values for the thin film constants $n_1$, $\alpha_1$, $t_1$, $n_2$, $\alpha_2$, $n_3$, and $\alpha_3$ and calculating spectral reflectances for a set of wavelengths corresponding to the monochromatic light produced by the filtered white light source. This calculation is done for a number of different outer layer thicknesses, $t_2$, and provided that the initial thin film constant assumptions are correct should only need to be computed once. This calculation provides sets of reflectance values, $\lambda_2, \ldots \lambda_n, t_2$) for thicknesses ranging from the thinnest to the thickest estimated value of the outer silicon layer. These computed spectral reflectances are then compared with the measured reflectance data, $R_m (\lambda_1, \lambda_2, \ldots \lambda_n, t_2)$, at specific points on the wafer using a root mean square (rms) merit function of the form $$M(x, y, t_2) = \left[ \frac{1}{nmax} \left[ \sum_{n=1}^{nmax} [R_m(\lambda_n, t_2) - R_c(\lambda_n, t_2)]^2 \right] \right]^{\frac{1}{2}}$$

This merit function is evaluated for different values of $t_2$ until a minimum or best match is found, which in turn indicates the most likely thickness. According further to the above cited application, it is, of course, apparent that other pattern matching merit functions can be used, if desired.

According to the teachings of the present invention, a numerical method such as described above can be improved. In the above described method, the thickness of the outer silicon layer in a silicon-on-insulator (SOI) wafer is determined by recording digitized images of the wafer at numerous different wavelengths. The voltage levels at each wavelength for any given pixel is proportional to the reflectance of the wafer and some method of converting the voltage levels into reflectance values ($R_m(\lambda_n, t_2)$) is required before any spectral matching with the calculated values ($R_c(\lambda_n, t_2)$) can be carried out. Once the data is converted, the set of converted reflectances are compared against a library of reflectances computed for a large range of outer film thicknesses. This comparison uses a least squares merit function computed at each outer film thickness and the merit function is a minimum when the set of measured reflectance values closely match the set of library reflectances.

According further to the above described method, the wafer reflectance at each wavelength can be determined by first recording N images of the SOI wafer at different wavelengths as well as N images of a bare silicon wafer at the same wavelengths. The voltage signal produced at a given pixel in the kth image of an SOI wafer is given by $$V_{SOI}(x_0, y, 0, \lambda_k) = \Omega(x_0, y_0, \lambda_k) R_{SOI}(x_0, y_0, \lambda_k) k = 1, \ldots, N,$$

where $\Omega(x_0, y_0, \lambda_k)$ represents the spatial and spectral response of the instrument, and $R_{SOI}(x_0, y_0, \lambda_k)$ is the wafer reflectance at point $(x_0, y_0)$ in the image. Similarly, for an uncoated silicon wafer $$V_{SI}(x_0, y_0, \lambda_k) = \Omega(x_0, y_0 \lambda_k) R_{SI}(x_0, y_0, \lambda_k) k = 1, \ldots, N.$$

The reflectance of the wafer can be obtained from these two measurements in terms of the computed reflectance of bare silicon $\rho_{SI}(\lambda_k)$ as $$\rho_{SOI}(x_0, y_0, \lambda_k) = \left[ \frac{R_{SOI}(x_0, y_0, \lambda_k)}{R_{SI}(x_0, y_0, \lambda_k)} \right] \rho_{SI}(\lambda_k)$$

$$k = 1, \ldots, N.$$

Note that, in the above described method, the spatial and spectral variations are normalized out of the computation of the merit function $M(x_o, y_o, t_j)$ which is defined as $$M(x_o, y_o, t_j) = \sum_{k=1}^{N} \left[ \frac{V_{SOI}(x_o, y_o, \lambda_k)}{V_{SI}(x_o, y_o, \lambda_k)} (\rho_{SI}(\lambda_k)) - \frac{L_{SOI}(\lambda_k, t_j)}{L_{SI}(\lambda_k, t_j)} \right]^2$$

$$j = 1, \ldots, T.$$

where $L_{SOI}(\lambda_k, t_j)$ is the computed library of reflectances for a range of thicknesses $j=1 \ldots$ MaxT and $\rho_{SI}(\lambda_k)$ is the spectral reflectance of silicon calculated from well known optical constants. This technique converts the voltage measurements to reflectances so that a comparison can be made; however, the technique requires full aperture wafer images to be recorded for two different types of wafers at two different times which can introduce errors due to registration, alignment and intensity changes in the source.

According to the teachings of the present invention, a significant improvement can be made in the thickness determination by noting that the use of wafer reflectances in the merit function can be replaced by matching a self normalized reflectance pattern as opposed to an absolute reflectance pattern. This new approach allows the number of measured images to be reduced by a factor of two by eliminating the need for measurements on a bare silicon wafer. In this scheme, the 2N measurements are replaced by N images and N spectral shape calibration constants.

Figure 4:
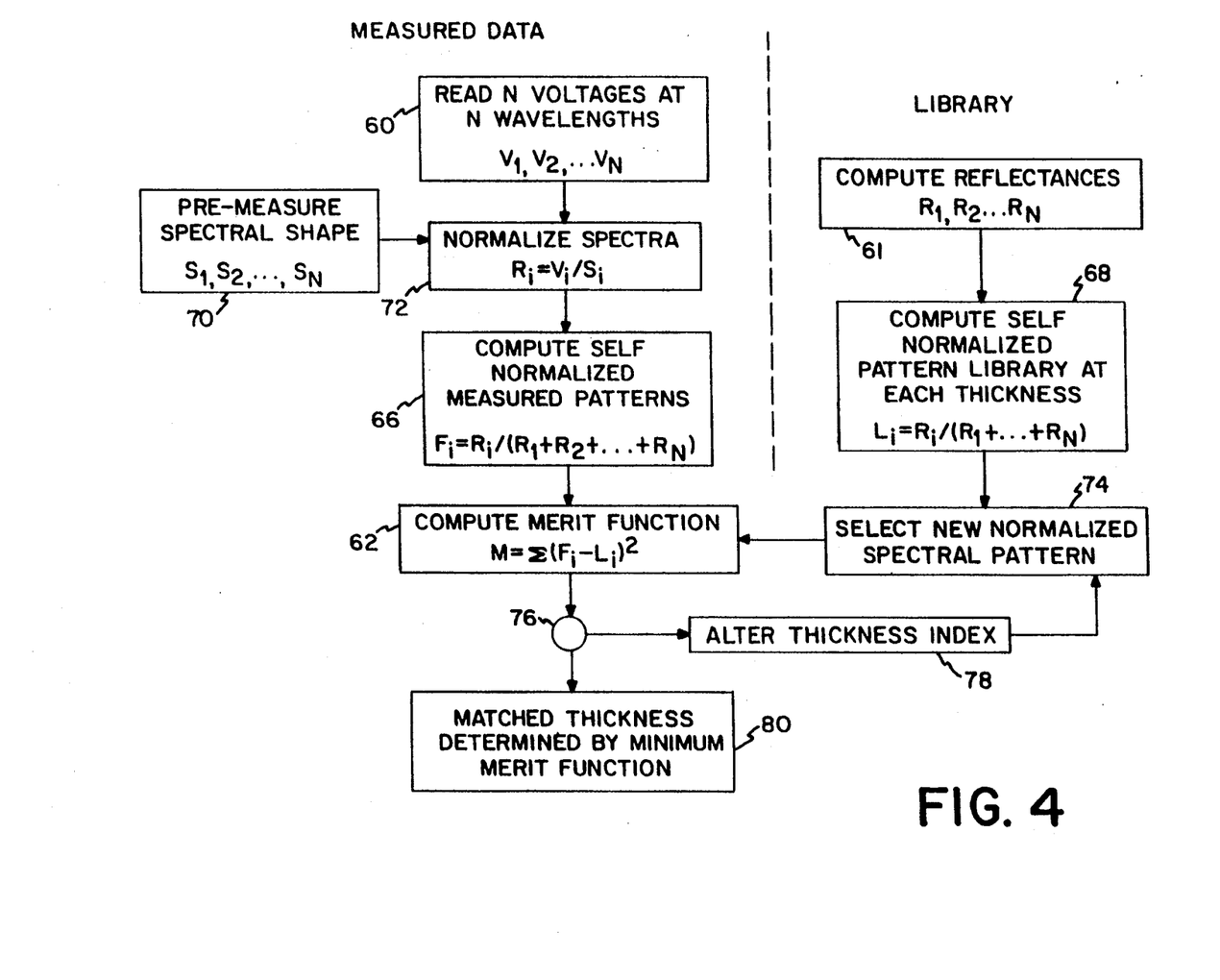
FIG. 4 is a flow chart showing a self-normalized method according to the present invention.

As shown in a step 60 in FIG. 4, measured data from one pixel consists of N digitized values $V_1 \ldots V_N$ at the wavelengths $\lambda_1 \ldots \lambda_N$ and corresponding library reflectances for any pixel are computed as shown in a step 61. A self normalized merit function shown in a step 62, for any thickness $t_j$, may take the form $M=\Sigma(F_i-L_i)^2$ which may be more fully described as $$M(t_j) = \sum_{k=1}^{N} \left[ \frac{\frac{V_{sot}(\lambda_k)}{\Omega_k}}{\sum_{k=1}^{N} \frac{V_{sot}(\lambda_k)}{\Omega_k}} - \frac{L_{sot}(\lambda_k, t_j)}{\sum_{k=1}^{N} L_{sot}(\lambda_k, t_j)} \right]^2$$

$$j = 1 \ldots T.$$

The measured quantity ($F_i$) within the brackets on the left hand side of the above merit function is computed as shown in FIG. 4 in a step 66. The corresponding computed quantity ($L_i$) on the right hand side of the merit function is computed as shown in a step 68.

The factors $\Omega_k$ are pre-measured spectral shape factors (corresponding to factors $S_1, S_2, \ldots, S_N$ shown in a step 70 in FIG. 4) used to relate the voltage to reflectance for each wavelength as shown in a step 72. However, they can themselves be normalized to any wavelength to provide a dimensionless set of spectral shape factors $\gamma_1 \ldots \gamma_N$, as shown below. Such spectral shape factors are thus $$\gamma_1 = \frac{\Omega_1}{\Omega_1} = 1, \gamma_2 = \frac{\Omega_2}{\Omega_1}, \ldots, \gamma_N = \frac{\Omega_N}{\Omega_1}.$$

and are equally usable as the factors $\Omega_k$ described above in connection with steps 70, 72.

The merit function, as shown in the step 62 in FIG. 4, can thus be written in terms of these normalized spectral shape factors (Tk) as follows:

$$M(t_j) = \sum_{k=1}^{N} \left[ \frac{\frac{V_{sot}(\lambda_k)}{\gamma_k}}{\sum_{k=1}^{N} \frac{V_{sot}(\lambda_k)}{\gamma_k}} - \frac{L_{sot}(\lambda_k, t_j)}{\sum_{k=1}^{N} L_{sot}(\lambda_k, t_j)} \right]^2$$

$$j = 1 \ldots T.$$

It should be realized that the above merit function contains only measured data from a single pixel together with computed library patterns $L_{sot}(\lambda_k, t_j)$ which are functionally of the same form as the ratios of the measured data.

The N spectral shape calibration factors ($\gamma_1, \ldots, \gamma_N$) are obtained from single point measurements on a known reflector such as shown in FIG. 3 as a small bare silicon mirror 56 in the instrument field and need only be made occasionally since the measured ratios inside the merit function are independent of intensity variations and non-uniform illumination problems. This scheme eliminates the need to record full images of a bare silicon calibration wafer.

The computation of the merit function shown in step 62 of FIG. 4 is, as suggested, a repetitive computation over a large number of possible thicknesses. This is shown in FIG. 4 by showing a comparison loop comprising the steps 74, 62, 76, 78 whereby a new normalized spectral pattern is selected from the library in a step 74 according to a step 78 which indicates that a thickness index has changed in response to a determination in a step 76 that the next thickness pattern needs to be compared. This would be done, for example, in steps of 10Å all the way from 10 microns down to zero thickness. After all these thicknesses have been compared, a step 80 determines the best fit and hence the actual thickness for a pixel. The whole process is then repeated for the next pixel, and so on, until the entire wafer surface has its thickness determined.

It should be realized that the above description was primarily made in the context of a particular embodiment but that the invention is not limited thereto. Indeed, the invention can be used for determining an unknown layer thickness among any number of layers, provided all the other layers' thicknesses are known and the optical properties of all layers are accurately known.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. An apparatus for measuring the thickness of a layer of material having front and rear surfaces, said material having a property that will transmit radiation, said apparatus comprising:

means for irradiating an entire front surface area of said layer with a collimated monochromatic radiation so that reflected radiation from said front and rear surfaces has characteristics corresponding to said thickness of said layer in said surface area and wherein said means for irradiating with monochromatic radiation comprises means for sequentially irradiating said surface area with monochromatic light of differing wavelengths, so that ambiguities arising when said thickness is a multiple of a wavelength are eliminated;

means for receiving said reflected radiation and for detecting said characteristics; and means for self-normalizing said detected characteristics and for comparing said self-normalized characteristics of said received radiation with a set of reference characteristics corresponding to known thicknesses and for providing an output corresponding to said thickness of said layer in said area.

2. The apparatus of claim 1, wherein said detected characteristics at all said wavelengths are self-normalized by dividing each detected characteristic at a given wavelength by a sum of all detected characteristics at all said wavelengths.

3. An apparatus as described in claim 1, wherein said set of reference characteristics is computed based on predetermined thicknesses and assumed optical properties of the material.

4. An apparatus as described in claim 1, wherein said characteristics corresponding to said thickness of said layer comprise a reflectance of said material and said means for receiving said reflected radiation comprises a charge coupled device.

5. An apparatus as described in claim 4, wherein said means for self-normalizing and comparing said detected characteristics comprises:
digitizing means for digitizing said output signal of said charge coupled device; and
computing means for self-normalizing said digitized output signal and for comparing said self-normalized digitized signal with a set of digitized signals corresponding to said reference characteristics.

6. An apparatus as described in claim 1, wherein said means for self-normalizing is also for self-normalizing said reference characteristics for comparison with said self-normalized detected characteristics.

7. An apparatus as described in claim 1, wherein said set of reference characteristics used in said means for comparing is computed based on predetermined thicknesses and assumed properties of said material.

8. An apparatus for measuring the thickness of a layer of material having front and rear surfaces, said layer being one of a possible plurality of layers each having front and rear surfaces and formed on a front surface of a substrate, said material having properties that will transmit light, said apparatus comprising:
means for providing a beam of collimated light;
means for inserting in said beam of collimated light a plurality of narrow band filters, each filter passing a single wavelength so that said beam of collimated light becomes monochromatic;
means for expanding said beam of collimated light so as to irradiate an entirety of said front surface of said layer, said light being reflected off said front and rear surfaces of said layer and said front and rear surfaces of said possible plurality of other layers and the front surface of the substrate, said reflected light interacting to form a fringe pattern an image of which is reflected;
means for directing said image of said reflected fringe pattern onto an active surface of a charge coupled device camera, said camera providing an output corresponding to said fringe pattern;
means for digitizing said output of said charge coupled device camera; and
means for receiving said digitized output of said charged coupled device camera for self-normalizing said digitized output and for comparing said self-normalized output with a set of stored self-normalized reference characteristics corresponding to known layer thicknesses and for providing an output corresponding to a thickness map of said layer thickness.

9. The apparatus of claim 8, wherein said self-normalized digitized output is obtained by dividing each detected characteristic at a given wavelength by a sum of all detected characteristics at all wavelengths.

10. A method for measuring the thickness of a layer of material having front and rear surfaces, said material having properties that will transmit radiation, said method comprising the steps of:
sequentially irradiating an entire front surface area of said layer with a collimated monochromatic radiation of differing wavelengths so that reflected radiation from said front and rear surfaces has characteristics corresponding to said thickness of said layer in an area and so that ambiguities, arising when said layer thickness is a multiple of a wavelength, are manifested;
receiving said reflected radiation;
detecting said characteristics of said received radiation;
for each detected characteristic at each wavelength, self-normalizing each of said detected characteristics to scale each of said detected characteristics for comparison with a set of reference characteristics;
comparing said self-normalized detected characteristics of said received radiation with said set of reference characteristics corresponding to known thicknesses; and
providing an output corresponding to said thickness of said layer in said area based on said comparing of said detected characteristics with said set of reference characteristics.

11. A method as described in claim 10, additionally comprising the step of computing said set of reference characteristics based on predetermined thicknesses and assumed optical properties of said material; and storing said set of computed reference characteristics.

12. The method as described in claim 10, additionally comprising the step of self-normalizing said set of reference characteristics prior to said comparing step.

13. A method as described in claim 10, wherein said step of detecting said characteristics comprises detecting said characteristics using a charge coupled device camera, said camera providing output signals corresponding to said characteristics and said method further comprising the steps of:
digitizing said output signals from said charge coupled device camera; and
self-normalizing and comparing said digitized signals with a set of digitized reference signals, corresponding to said set of reference characteristics.

14. A method as described in claim 13, wherein said characteristic is a reflectance as manifested by said reflected radiation and said charge coupled device camera measures said reflected radiation at a plurality of points to determine said thickness of said layer at said plurality of different points.

15. A method as described in claim 10, further comprising the steps of:
performing a chemical micropolishing process upon said front surface of said layer in accordance with said output corresponding to said thickness of said layer; and
repeating said above mentioned steps sequentially until said thickness of said layer corresponds to a predetermined value.

16. The method of claim 10, wherein said step of self-normalizing comprises the step of dividing each detected characteristic by a sum of detected characteristics.

17. The method of claim 10, further comprising the step of normalizing said detected characteristics against corresponding pre-measured spectral response characteristics.

18. The method of claim 12, wherein said step of self-normalizing said set of reference characteristics comprises the step of dividing each reference characteristic by a sum of reference characteristics.

19. A method for use with an instrument for determining actual thickness of an unknown thickness layer among one or more layers of known optical properties and thicknesses by comparing, by means of a merit function, a library of computed reflectances at different wavelengths with corresponding measured reflectances at the different wavelengths, further comprising the steps of:

compiling a library of self-normalized computed reflectances based on the library of computed reflectances at each of a plurality of thicknesses at each of the different wavelengths;

computing, for each of the measured reflectances for each of a plurality of areas of the unknown thickness layer, a self-normalized measured reflectance for each of the different wavelengths;

computing the merit function, for each area, for each of the plurality of thicknesses, for comparing the self-normalized measured reflectances with the library of self-normalized computed reflectances at each of the plurality of thicknesses; and selecting, for each area, a thickness from the plurality of thicknesses based on the magnitude of the merit function.

20. The method of claim 15, wherein said step of compiling is carried out by dividing each computed reflectance at each thickness by a sum of computed reflectances for all of the plurality of wavelengths.

21. The method of claim 19, further comprising the step of measuring, for a selected reflector, a spectral response of the instrument over the different wavelengths and, before computing the self-normalized measured reflectance, normalizing the measured reflectances at each of the different wavelengths with respect to the spectral response of the instrument at the different wavelengths.

22. The method of claim 21, wherein said normalizing the measured reflectances is carried out by dividing each measured reflectance at each wavelength for a given thickness by the measured spectral response of the instrument for that wavelength.

23. The method of claim 22, further comprising the step of normalizing the measured spectral response for each wavelength with respect to the measured spectral response for the different wavelengths.

24. The method of claim 23, wherein the step of normalizing the measured spectral response for each wavelength is carried out by dividing the measured spectral response for each wavelength by the measured spectral response for a selected one of the wavelengths.

25. The method of claim 19, wherein said step of computing, for each area, a self-normalized measured reflectance for each thickness for each of the different wavelengths is carried out by dividing the measured reflectance for each of the different wavelengths by a sum of measured reflectances.

26. The method of claim 21, wherein said step of computing, for each area, a self-normalized measured reflectance for each thickness for each of the different wavelengths is carried out by dividing the measured reflectance for each of the different wavelengths by a sum of normalized measured reflectances.

* * * * *